United States Patent Office 3,378,348
Patented Apr. 16, 1968

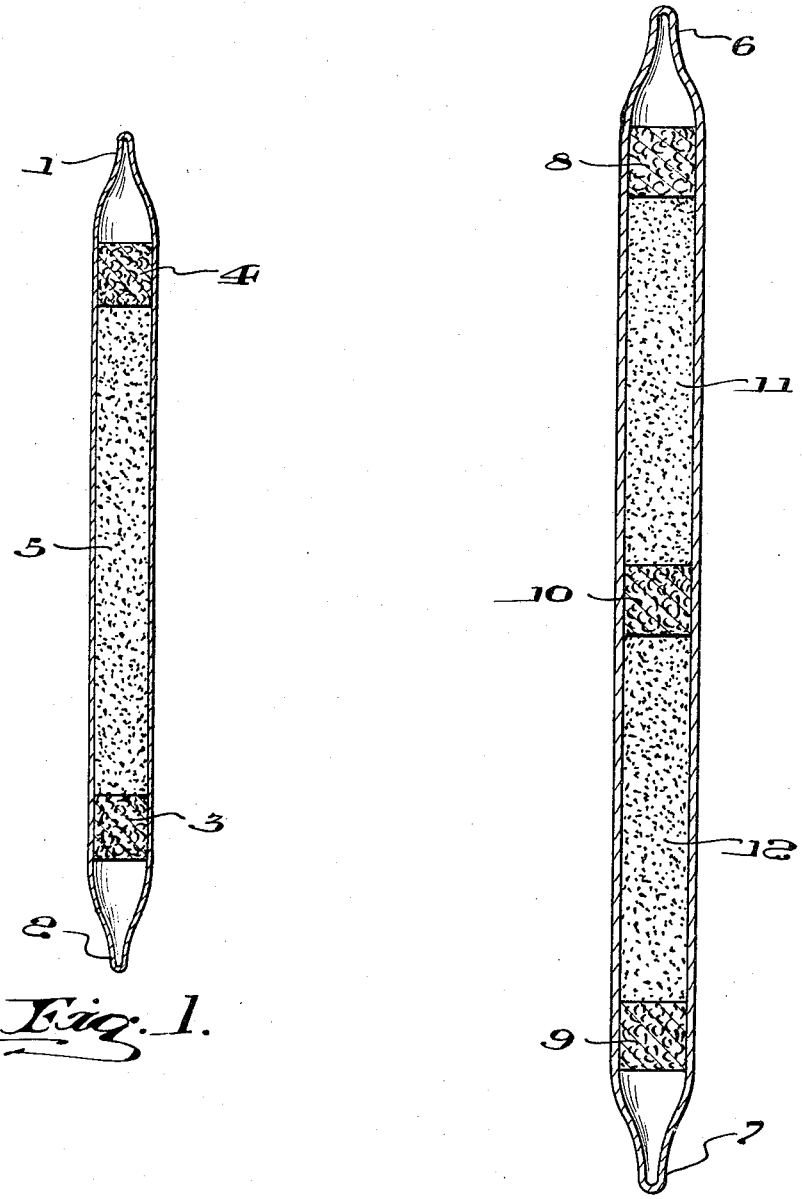

3,378,348
INDICATOR FOR THE DETERMINATION OF SULFUR DIOXIDE AND HYDROGEN SULFIDE
Paul W. McConnaughey, Pittsburgh, Pa., assignor to Mine Safety Appliances Company, Pittsburgh, Pa., a corporation of Pennsylvania
Filed Feb. 6, 1964, Ser. No. 343,005
9 Claims. (Cl. 23—254)

ABSTRACT OF THE DISCLOSURE

A colorimetric indicator, responsive to sulfur dioxide, has a non-porous inorganic carrier with an alkaline clay coating impregnated with Phenol Red or Bromothymol Blue. When an elongate bed of the indicator is disposed in a transparent tube, sulfur dioxide can be detected or qantitatively determined by passing a gas sample through the bed. The indicator does not respond to or retain hydrogen sulfide; sulfur dioxide and hydrogen sulfide are simultaneously detected or quantitatively determined by passing the gas to be tested sequentially through the indicator and a second indicator responsive to hydrogen sulfide, as by passing gas through a transparent tube containing separate elongate beds of the two indicators.

---

This invention relates to the detection and quantitative determination of sulfur dioxide and mixtures of sulfur dioxide and hydrogen sulfide in other gases.

Convenient, simple and rapid methods have been used to quantitatively and qualitatively determine a number of gases other than sulfur dioxide in which the gas is passed through a bed of dry granular reagent impregnated with an appropriate color changing indicator. Heretofore, such reagents for determining sulfur dioxide, e.g., the reagents disclosed by McConnaughey in U.S. Patent 2,736,638, are comparatively unstable; in practice the reagent components are commonly contained in separate ampoules so that the indicator can be freshly mixed when it is to be used. In use, the ampoules are broken, the reagent solutions are mixed and distributed over an absorbent carrier such as silica gel to form an indicating bed that must promptly be used to obtain a satisfactory analysis. This preparation of fresh indicator is inconvenient, time consuming, and not completely satisfactory for use by untrained or unskilled personnel, especially for testing in the field.

In industrial uses sulfur dioxide and hydrogen sulfide frequently are present together in the atmosphere to be analyzed so it is therefore desirable to simultaneously separately determine both sulfur dioxide and hydrogen sulfide. Reagents heretofore available are not suitable for such an analysis because one gas interferes with the analysis of the other, e.g. the aforementioned sulfur dioxide reagent does not develop any color change in the presence of hydrogen sulfide, or the reagent for determining one of the gases absorbs the other, e.g. the well-known silver cyanide carried on activated alumina for determining hydrogen sulfide also absorbs and captures sulfur dioxide.

It is therefore an object of this invention to provide a simple, rapid and reliable method of detecting and quantitatively determining sulfur dioxide in gases, particularly in air, that is satisfactory for field and plant use, and that may be practiced by unskilled persons. It is another object to provide a simple, rapid and reliable method of simultaneously detecting and quantitatively determining sulfur dioxide and hydrogen sulfide in gases, particularly in air, that may be pricticed by unskilled persons.

Another object is to provide a stable solid reagent that changes color on contact with sulfur dioxide suitable for use in the foregoing objects.

This invention is predicated on my discovery that a distinct color change occurs when air or other gas that contains sulfur dioxide is passed through a bed of indicator formed of a finely divided, non-porous carrier having an alkaline coating of inorganic absorbent, frequently referred to herein as the binder, impregnated with Phenol Red (phenolsulfonephthalein) or Bromothymol Blue (3'-3''-dibromothymolsulfonephthalein) and that such an indicator does not absorb or react with hydrogen sulfide and is not affected by hydrogen sulfide. When air or other gas to be tested is passed through such a solid reagent disposed in a transparent tube of glass or other inert material, the presence of sulfur dioxide causes the development of a contrasting color along the length of the reagent bed in the direction in which the air is passed, thus affording indication of the presence of sulfur dioxide. The length over which the coloration occurs is dependent, when tested under standard conditions, upon the concentration of sulfur dioxide in the atmosphere tested. When using Phenol Red the color change is from pink to yellow; when using Bromothymol Blue the color change is from blue to yellow. Since my reagent does not react with or retain any hydrogen sulfide that may be present in the gas to be tested, the gas sample effluent from the bed of my reagent may be sequentially passed through a bed of solid reagent responsive to hydrogen sulfide to determine hydrogen sulfide in the same manner as heretofore described for determining sulfur dioxide.

Indicator tubes in accordance with this invention are illustrated in the accompanying drawing in which:

FIG. 1 is a longitudinal cross-section through an indicator tube for determining sulfur dioxide; and FIG. 2 is a longitudinal cross-section through an indicator tube for simultaneously determining sulfur dioxide and hydrogen sulfide.

Referring to FIG. 1, a transparent tube, preferably of glass, has sealed ends 1 and 2. Adjacent each end is a layer of air pervious retaining material 3 and 4, such as, for example, glass wool or glass tape. Between the retaining layers is an elongate bed 5 of the indicator of this invention that changes color in response to sulfur dioxide. When a determination is to be made the sealed ends are opened and the air or other gas to be tested is flowed through the tube by any suitable means, as by an aspirator bulb. The presence of sulfur dioxide in the atmosphere changes the color of the indicator. To quantitatively determine sulfur dioxide, a measured volume of gas, supplied in any way as by means of an aspirator bulb with known volumetric delivery, is passed through a tube as just described, and the length over which the color change is developed affords a measure of the concentration of sulfur dioxide. By comparing the length of coloration with a scale calibrated by the use of the standard volume of different known concentrations of sulfur dioxide in air there is thus a direct determination.

Referring to FIG. 2, a transparent tube has sealed ends 6 and 7. Air previous retaining layers 8, 9, are adjacent each end and air pervious retaining layer 10 is centrally positioned within the tube. Between retaining layers 8 and 10 is an elongate bed 11 of the indicator of this invention that changes color in response to sulfur dioxide; between retaining layers 9 and 10 is an elongate bed 12 of an indicator that changes color in response to hydrogen sulfide, such as silver cyanide or lead acetate carried on activated alumina described in Littlefield, U.S. Patent 2,174,349. When a determination is to be made the sealed ends are opened and the air or gas to be tested is flowed through the tube in the same manner as described with reference to FIG. 1 in a direction so that the gas passes first through indicator layer 11 and subsequently through indicator layer 12. The length over which a color change is developed in layer 11 affords a measure of the concentration of sulfur dioxide. Since the indicator layer 11 does not absorb, react with or otherwise retain any significant amount of hydrogen sulfide, the gas passing through indicator layer 12 affords a true measure of the hydrogen sulfide by the development of a color change; by comparison of the length of coloration in layer 12 with a calibrated scale there is thus a simultaneous direct determination of hydrogen sulfide.

Inert carriers suitable for use in my indicator responsive to sulfur dioxide may be any finely divided, inorganic, non-porous material such as, for example, glass beads, powdered glass, glazed ceramic chips, glazed ceramic beads or metal shot. The particle size of the carrier is preferably sufficiently small to permit it to be poured to form a bed that appears to the unaided eye to be a continuous material, that is, the individual particles are not readily discernible to the unaided eye at a normal reading distance. The particle size should be sufficiently larger to permit gas flow through a bed of the particles without undue resistance to flow. Suitably, the particle size of carriers is between about 40 and 100 mesh and preferably between about 60–80 mesh. It is preferred to use carriers of spherical shape and substantially uniform size, such as glass beads, since they provide beds of readily determinable and reproducible surface area and flow resistance.

Suitable binders include any powdered, inorganic absorbent that adheres to the carrier, such as clay, acid treated clays, diatomaceous earth, bentonite, bauxite, fuller's earth or the like. In order to form an adherent film on the carrier, the binder must be of a substantially finer particle size than the carrier, generally it is preferred to use binders that pass a 200 mesh screen or are even more finely divided. A great variety of such binders are commercially available, for example, Florigel or Min-U-Gel 200, products of the Floridan Company. The indicator must be alkaline so a non-volatile base may be incorporated with any specific binder that is not alkaline.

The sulfur dioxide indicator of this invention is prepared by intimately mixing the desired amount of carrier, binder, colorimetric reagent, base if required, and a volatile liquid solvent or dispersing medium and then evaporating the volatile liquid from the mixture to form a dry, free-flowing finely divided indicator. The ingredients are preferably thoroughly premixed and the mixing action is continued throughout the period during which the solvent is evaporated. As will be apparent to those skilled in the art, such mixing and drying may be accomplished in a variety of ways, but a most convenient method is to mix and dry in a rotary drier that tumbles the mixture. Drying temperatures should be kept low enough to avoid decomposition of the reagent, preferably below about 90° C. Water, lower alcohols, lower ethers and the like are generally used as solvents or dispersing liquids, although any inert liquid may be used that is sufficiently volatile to permit removal of the liquid at sufficiently low temperatures at ordinary pressures or under vacuum.

The amount of binder used should not exceed that amount which will adhere to the carrier. Indicators containing too much binder have distinctly visible areas of coloration more intense than the main body of the indicator, so that any required adjustment of carrier and binder proportions can be made based on mere visual inspection. Excess binder can be sifted from an indicator by mild vibration. The amount of binder that will adhere to the carrier will vary depending on the particular binder and carrier used. An indicator exhibiting a uniform color can be obtained using substantially less than the aforementioned maximum amount of binder, and generally it is preferred to use from about 10 to 50% of the maximum amount of binder, which amount can be evenly dispersed with much less mixing. Illustrative of typical proportions, it is preferred to use between about 0.02 and 0.2 gram of binder to 100 grams of 60–80 mesh glass beads.

The following examples are illustrative of this invention.

Example I

Four hundred fifty-four grams of clean 70 mesh glass beads and 0.10 gram of the absorbent clay Min-U-Gel were mixed together in a glass bottle to evenly disperse the mixture. Then 2.5 ml. of 0.1% Phenol Red solution (alcoholic) and 0.5 ml. of 1% sodium carbonate solution (aqueous) were added to the mixture. While continuing the agitation, the mixture was vacuum dried until the indicator was dry and free flowing. The indicator produced was of a uniform pink color.

The proportion of base used can be varied over a wide range depending on the desired sensitivity of the reagent; that is, the amount of color change produced by a given amount of sulfur dioxide. It is generally preferred to use between about 0.001 and 0.04 gram of colorimetric reagent, or 1 to 40 ml. of a 0.1% solution of colorimetric reagent, per gram of binder, or per 1000 grams of carrier.

Example II

When using soft glass beads, alkali may be leached from the beads rather than adding it separately. Glass beads, absorbent clay and Phenol Red solution in the same proportions as Example I were thoroughly mixed. The mixture was heated in an oven at 80° C. for two hours to leach alkali from the soft glass beads. The mixture was then cooled and vacuum dried at 50° C. with agitation to form a free-flowing indicator as in Example I.

Example III

Sixty grams of glass beads, 0.3 gram of absorbent clay, 4 ml. of 0.04% Bromothymol Blue (alcoholic) and 0.5 ml. of 1% $Na_2CO_3$ solution (aqueous) were mixed and dried as in Example I to form a dry free-flowing indicator of uniform blue color.

Example IV

Soft glass beads, absorbent clay and Bromothymol Blue solution in the same proportions as Example III were mixed and heated at 80° C. for two hours to leach alkali from the soft glass beads. The mixture was cooled and vacuum dried to form an indicator as in Example III.

Example V

A number of indicator tubes as illustrated in FIG. 1 were prepared using a 3.0 mm. I.D. tube and having a bed of the indicator of Example II 70 mm. long. Samples of air containing $SO_2$ in varying concentrations were passed through the tubes at a flow rate of 100 cc./minute and the length of bed over which color development occurred was measured, as recorded in the following table:

SAMPLE VOLUME: 25 CC.

| $SO_2$ concentration (p.p.m.): | Lenth of color change (mm.) |
| --- | --- |
| 0 | 0 |
| 5 | 1 |
| 10 | 2 |
| 25 | 5.5 |
| 50 | 9 |
| 100 | 18 |
| 200 | 33 |
| 400 | 61 |

SAMPLE VOLUME: 200 CC.

| $SO_2$ concentration (p.p.m.): | Length of color change (mm.) |
|---|---|
| 0 | 0 |
| 1 | 1.5 |
| 2 | 3.0 |
| 5 | 7.0 |
| 10 | 14.0 |
| 15 | 21 |
| 20 | 27 |
| 25 | 33 |
| 50 | 61 |

The sample volume can be increased tenfold or more to determine lower concentrations of sulfur dioxide, the lowest range of detection being about 0.05 p.p.m. of $SO_2$ when using a 2-liter sample volume.

With indicator tubes that contain an upstream bed of indicator responsive to sulfur dioxide and a downstream bed of indicator responsive to hydrogen sulfide, as illustrated in FIG. 2, either sulfur dioxide or hydrogen sulfide can be determined or both can be simultaneously determined in gas samples that contain both gases. Both gases are independently determined; that is, the length of color change developed in the sulfur dioxide indicator bed is the same length as that developed when a sample containing the same concentrations of sulfur dioxide is passed through a tube containing only sulfur dioxide indicator, and the length of the color change in the hydrogen sulfide indicator bed is the same length as that developed when a sample containing the same concentration of hydrogen sulfide is passed through a tube containing only hydrogen sulfide indicator.

The indicator tubes of this invention are quite stable, and no change in response was observed with tubes that were subjected to accelerated aging tests equivalent to about two years storage at normal ambient temperatures.

My sulfur dioxide indicator is particularly advantageous for determining sulfur dioxide since it is not adversely affected by acid gases frequently accompanying sulfur dioxide in industrial practice. Thus, for example, hydrogen sulfide passes through the indicator without affecting the accurate determination of sulfur dioxide in the sample. Similarly, nitric acid in low concentrations, e.g. 10–25 p.p.m., does not affect the indicator, although at higher concentrations, e.g. 50 p.p.m., the color of the indicator throughout the bed is faded resulting in a somewhat less distinct color change by the sulfur dioxide. Nitrogen dioxide affects the indicator in the same manner as high concentrations of nitric acid. Other strong acid gases interfere with analysis of $SO_2$ by giving a false color development only at high concentrations, e.g. 300 p.p.m. HCl reads as 22 p.p.m. $SO_2$.

According to the patent statutes, I have explained the principle and mode of practicing my invention and have described what I now consider to be its best embodiment. However, I desire to have it understood that, within the scope of the appended claims, the invention may be practiced otherwise than as specifically described.

I claim:
1. Means for determining sulfur dioxide and hydrogen sulfide comprising the combination of a sealed transparent tube, having disposed therein a first body of indicator consisting essentially of finely divided, non-porous, inorganic carrier having an adherent alkaline clay coating impregnated with a colorimetric reagent selected from the group consisting of Phenol Red and Bromothymol Blue and a second body of indicator responsive to hydrogen sulfide disposed within said tube and spaced from said first body of indicator.

2. Means according to claim 1 in which said second body of indicator consists essentially of activated alumina impregnated with silver cyanide.

3. Means for determining sulfur dioxide comprising a sealed transparent tube having disposed therein an elongate bed of a solid indicator consisting essentially of a finely divided, non-porous inorganic carrier having an adherent alkaline clay coating impregnated with a colorimetric reagent selected from the group consisting of Phenol Red and Bromothymol Blue.

4. A solid indicator for determining sulfur dioxide consisting essentially of a finely divided, non-porous, inorganic carrier having an adherent alkaline clay coating impregnated with a colorimetric reagent selected from the group consisting of Phenol Red and Bromothymol Blue.

5. An indicator according to claim 4 in which the carrier is glass beads of a size between about 60 and 80 mesh.

6. An indicator according to claim 5 in which there is between about 0.02 and 0.2 gram of absorbent for each 100 grams of glass beads.

7. An indicator according to claim 4 in which the coating is impregnated with a non-volatile base.

8. An indicator according to claim 7 in which the base is sodium carbonate.

9. An indicator according to claim 7 in which from about 0.001 to 0.04 gram of colorimetric reagent and about 0.2 gram of non-volatile base is carried by each 1000 grams of carrier.

References Cited
UNITED STATES PATENTS

| 2,174,349 | 9/1939 | Littlefield | 23—232 |
| 2,736,638 | 2/1956 | McConnaughey | 23—232 |
| 3,112,998 | 12/1963 | Grosskopf | 23—254 |

OTHER REFERENCES

Yoe, J. H.: Photometric Chemical Analysis, vol. I, John Wiley & Sons, New York, 1928, pp. 205–209 relied on.

MORRIS O. WOLK, *Primary Examiner.*

R. M. REESE, *Assistant Examiner.*